US012703004B2

(12) United States Patent
Caldwell et al.

(10) Patent No.: US 12,703,004 B2
(45) Date of Patent: Aug. 11, 2026

(54) CONVERTER FOR AN ULTRASONIC WELDING DEVICE HAVING INCREASED ARC RESISTANCE

(71) Applicant: Branson Ultrasonics Corporation, Brookfield, CT (US)

(72) Inventors: Scott Caldwell, New Milford, CT (US); John Maneca, Waterbury, CT (US); Eugene D. Pollastro, Bethel, CT (US)

(73) Assignee: Branson Ultrasonics Corporation, Brookfield, CT (US)

( * ) Notice: Subject to any disclaimer, the term of this patent is extended or adjusted under 35 U.S.C. 154(b) by 982 days.

(21) Appl. No.: 17/960,113

(22) Filed: Oct. 4, 2022

(65) Prior Publication Data

US 2024/0114294 A1 Apr. 4, 2024

(51) Int. Cl.

*B06B 1/06* (2006.01)
*H04R 17/00* (2006.01)
*H04R 31/00* (2006.01)

(52) U.S. Cl.

CPC ............ *B06B 1/0611* (2013.01); *H04R 17/00* (2013.01); *H04R 31/006* (2013.01)

(58) Field of Classification Search

CPC ....... B06B 1/0611; B06B 1/0607; B06B 1/06; H04R 17/00; H04R 31/006; B29C 66/924; B29C 65/08; B29C 66/8322; B23K 20/10; B23K 20/106
USPC .......................................................... 310/311
See application file for complete search history.

(56) References Cited

U.S. PATENT DOCUMENTS

| | | | | |
|---|---|---|---|---|
| 3,645,504 | A | 2/1972 | Jacke | |
| 4,028,033 | A | 6/1977 | Bryant | |
| 4,411,720 | A | 10/1983 | Sager | |
| 4,585,152 | A | 4/1986 | Sager | |
| 5,590,866 | A | 1/1997 | Cunningham | |
| 8,199,931 | B1 | 6/2012 | Norris et al. | |
| 2006/0066181 | A1 * | 3/2006 | Bromfield ............ | H10N 30/877 310/363 |
| 2007/0080609 | A1 | 4/2007 | Johnson et al. | |
| 2007/0170820 | A1 | 7/2007 | Bromfield | |
| 2019/0176262 | A1 | 6/2019 | Gabre et al. | |

OTHER PUBLICATIONS

Partial European Search Report regarding European Patent Application No. 23201443.1, dated Feb. 16, 2024.
"Piezolelectric transducer design: Ultrasonic Resonators," XP093084546, Jan. 6, 2022, Retrieved from the Internet: URL http://www.ultrasonic-resonators.org/design/transducers/transducer_design.html, [retrieved on Sep. 21, 2023].
Extended European Search Report regarding European Patent Application No. 23201443.1, dated May 28, 2024.

* cited by examiner

*Primary Examiner* — Jorge L Salazar, Jr.
(74) *Attorney, Agent, or Firm* — Harness, Dickey & Pierce, P.L.C.

(57) ABSTRACT

A converter for an ultrasonic welder includes a stack of piezoelectric disks alternately stacked with metal conductor disks in between. A pair of driver plates are disposed on opposite ends of the stack of piezoelectric disks. The piezoelectric disks include an outer perimeter surface that extends radially outward beyond the metal conductor disks. The outer perimeter surface of the piezoelectric disks can include an undulating surface.

18 Claims, 5 Drawing Sheets

PRIOR
ART

PRIOR
ART

CONVERTER FOR AN ULTRASONIC WELDING DEVICE HAVING INCREASED ARC RESISTANCE

FIELD

The present disclosure relates to an ultrasonic device and more particularly to a converter for an ultrasonic welding device having an increased arc resistance.

BACKGROUND

This section provides background information related to the present disclosure which is not necessarily prior art.

Ultrasonic converters, which are common in the ultrasonic welding art, use piezo material to convert electrical power into ultrasonic mechanical motion. A typical design of a relatively high-power converter, also common in the art, is shown in FIG. 4. The converter includes a stack of disk-shaped piezo rings 14, electrode plates 16 between the rings 14, a back driver mass 10, and a front driver mass 12 that are all held together under tension by a bolt 18 down the center.

One of the factors that can lead to the design of a more powerful converter for ultrasonic welding is the increase of voltage applied to the piezo disks in a converter. There is a physical limit as to the practical maximum voltage that can be supplied in that, beyond the limit, arcing begins to occur between the plates that supply the voltage that are typically located between the piezo disks. These arcs usually travel on the surfaces of the ends of the piezo disks. In the present art, the path length of the surfaces at the inside and outside ends of these disks is a straight line which has the least possible resistance to arc over.

One of the methods in the prior art to help mitigate the arc over is to use insulating coatings on the outside of the piezo stack. Typically, a high-power piezo stack has a hole down its center to accommodate a bolt that holds the stack together under compression. In the prior art, this hole is not coated because of the difficulty of applying the coating after assembly of the stack. If the coating is applied before assembly and dries, when the bolt is applied, the coating cracks. If the coating is applied wet before assembly, when the bolt is inserted, which is typically done manually, coating gets on the bolt which prevents assembly.

SUMMARY

This section provides a general summary of the disclosure, and is not a comprehensive disclosure of its full scope or all of its features.

One aspect of the present disclosure is to increase the arc path length of the end surfaces on the piezo material so that the resistance to arc over between the plates is increased, thus allowing for more powerful converter designs.

Another aspect of the present disclosure is to apply an insulating coating wet on the inside of any holes down its inside of the piezo stack before the stack is assembled. A jigging is used to hold the stack precisely in place. The compression bolt(s) that go inside this/these hole(s) is/are precisely placed mechanically to avoid contact with the wet coating, and then tightened while the coating is wet. The whole assembly is then allowed to dry. This also increases resistance to arc over, thus also allowing more powerful converter designs.

A converter for an ultrasonic welder includes a stack of piezoelectric disks alternately stacked with metal conductor disks in between. A pair of driver plates are disposed on opposite ends of the stack of piezoelectric disks. The piezoelectric disks include an outer perimeter surface that has an increased arc length. The outer perimeter surface of the piezoelectric disks can include an undulating surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
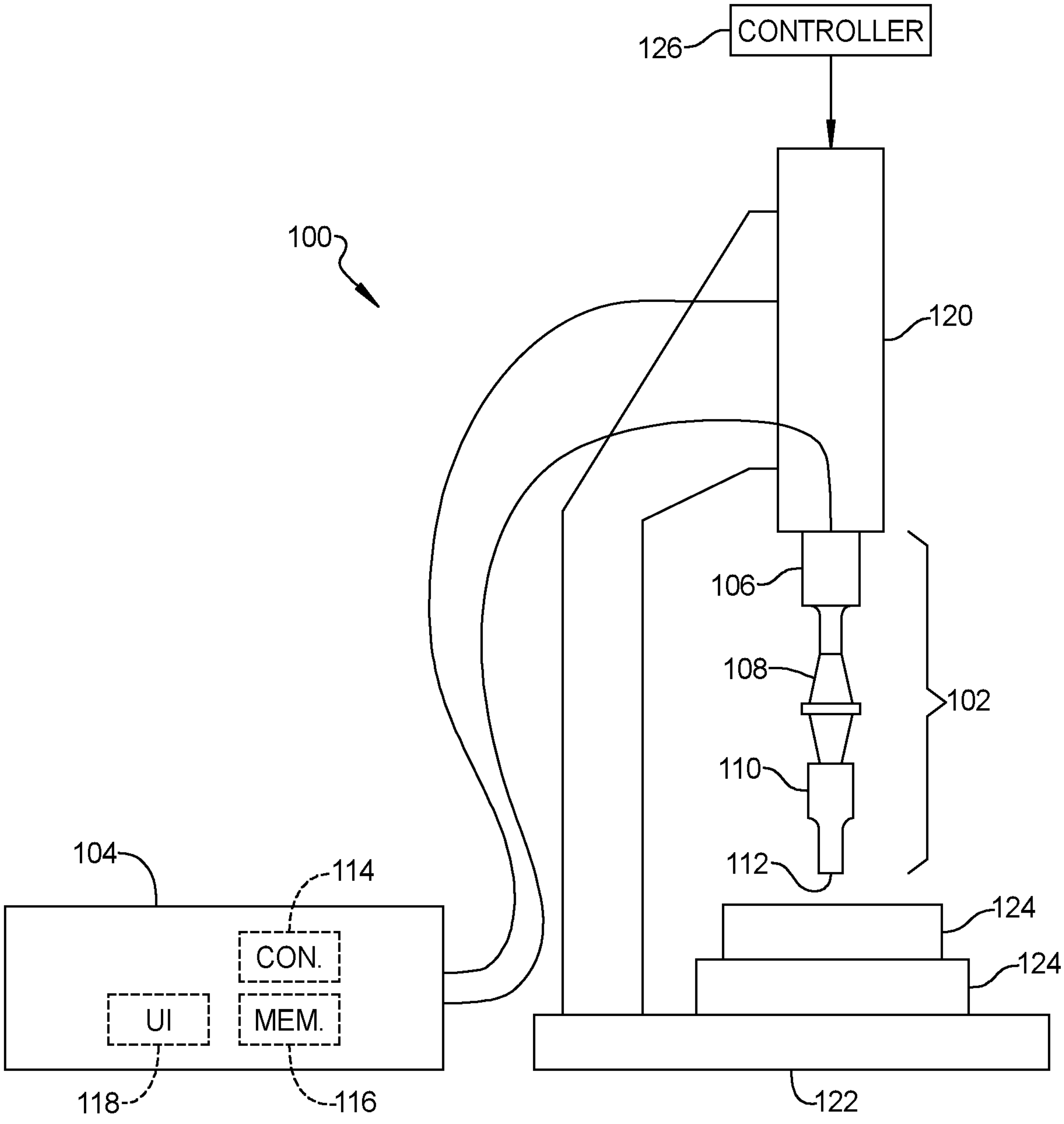
FIG. 1 is a schematic view of a workpiece processing device according to an example embodiment.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a model of a typical prior art ultrasonic system 100 having an ultrasonic stack 102 and ultrasonic power supply 104 is shown. It should be understood that ultrasonic system 100 can be any type of ultrasonic system that has an ultrasonic stack excited by an ultrasonic power supply. Typical components of ultrasonic stack 102 include an ultrasonic converter 106, a booster 108 and an ultrasonic horn 110. It should be appreciated that not every ultrasonic stack 102 includes booster 108. It should be further appreciated that not every ultrasonic stack 102 includes ultrasonic horn 110. Ultrasonic horn 110 will often have one or more ultrasonic horn tip (not shown). Booster 108 and ultrasonic horn 110 are ultrasonically connected (directly or via another component) to ultrasonic converter 106. In the example of FIG. 1, booster 108 is mounted to ultrasonic converter 106 ultrasonically connecting booster 108 to ultrasonic converter 106, and ultrasonic horn 110 is mounted to booster 108 ultrasonically connecting ultrasonic horn 110 to booster 108, and thus ultrasonically connecting ultrasonic horn 110 to ultrasonic converter 106 via booster 108.

Power supply 104 is controlled by a controller 114 that includes memory 116. It should be understood that controller 114 can be included in power supply 104 or separate from power supply 104.

Ultrasonic system 100 will often include an anvil 122 on which a work piece to be processed will be supported and contacted by ultrasonic horn tip 112 when it is being processed. For example, if two metal or plastic parts 124 are being welded together, they are supported on anvil 122 and pressed together by the ultrasonic horn tip during the weld process as actuator 120 moves ultrasonic stack 102 relative to the two parts 124 where the horn tip also ultrasonically vibrates against one of the parts to ultrasonically weld the two parts 124 together. Actuator 120 is controlled by a controller 126 which may be a separate controller from controller 114 of ultrasonic power supply 104 or controller 114 of ultrasonic power supply 104 may control actuator 120.

Figure 4:
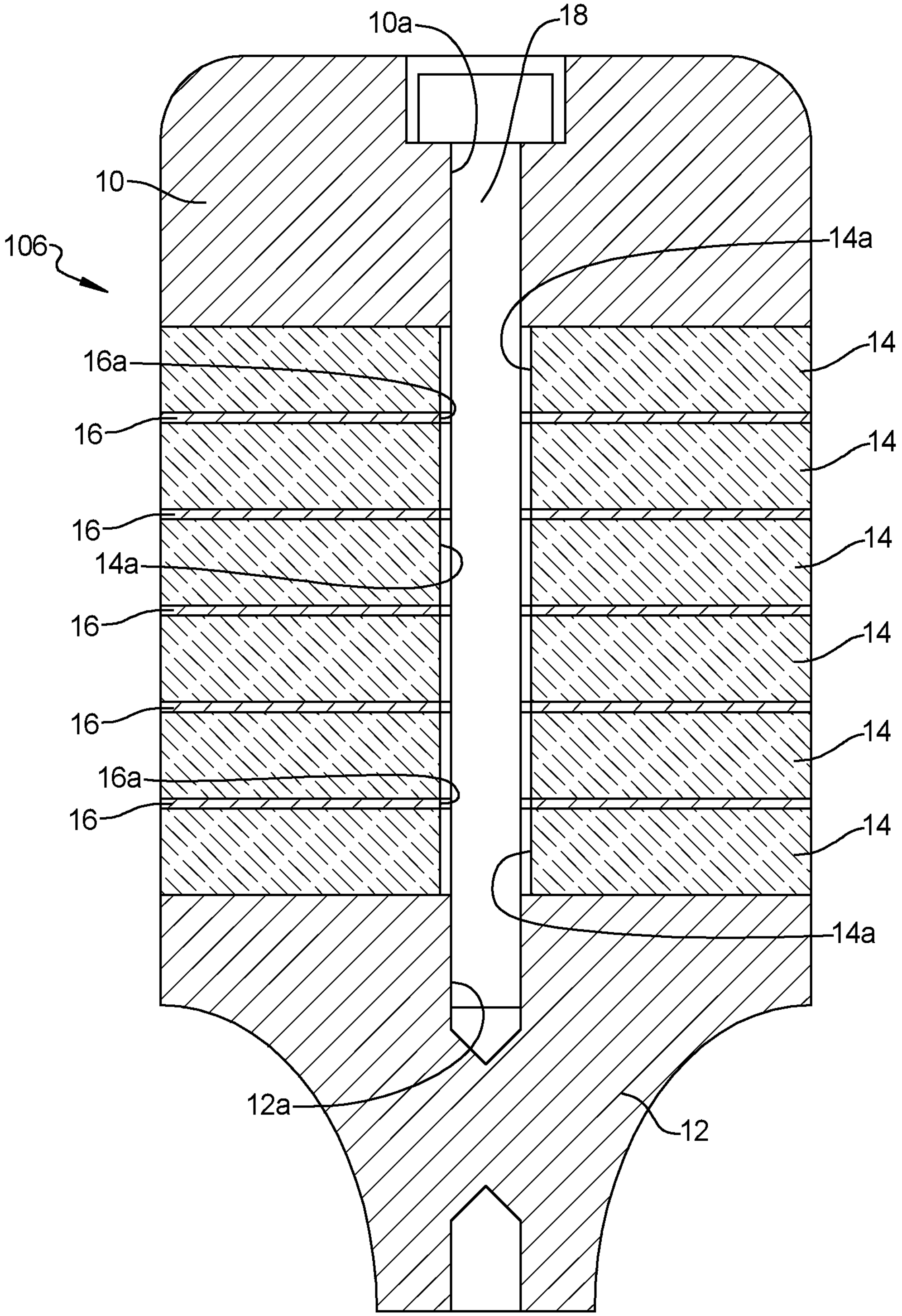
FIG. 4 is a cross-sectional view of a conventional converter.

With reference to the cross-sectional view of FIG. 4, a converter 106 according to the conventional art will now be described. The converter 106 includes a back driver 10 and a front driver 12 which can each be formed from metal. A plurality of piezoelectric disks 14 are stacked alternately with metal conductor disks 16 in between. Although a stack of piezoelectric disks 14 and metal conductor disks are shown, it should be understood that a single piezoelectric disk 14 can be utilized between the back driver 10 and the front driver 12. The piezoelectric disks or disk 14 can be formed from a piezoelectric ceramic material. The converter 106 can be held together by a bolt 18 inserted through a hole **10*a* in the back driver 10, a hole 14*a* in each of the piezoelectric disks 14, a hole 16*a* in each of the metal conductor disks 16 and threadedly engaged with a threaded aperture 12*a* in the front driver 12**.

One of the factors that can lead to the design of a more powerful converter 106 is an increase of voltage applied to the piezoelectric disks 14 in a converter. There is a physical limit as to the practical maximum voltage that can be supplied in that, beyond the limit, arcing begins to occur between the metal conductor disks 16 that supply the voltage that are located between the piezoelectric disks 14. These arcs usually travel on the surfaces of the outer diameter surface of the piezoelectric disks and the inner diameter surface of the holes of the piezoelectric disks 14. In the present art, as shown in FIG. 4, the path length of the surfaces at the inside and outside surfaces of these disks 14 is a straight line which has the least possible resistance to arc over.

Figure 2:
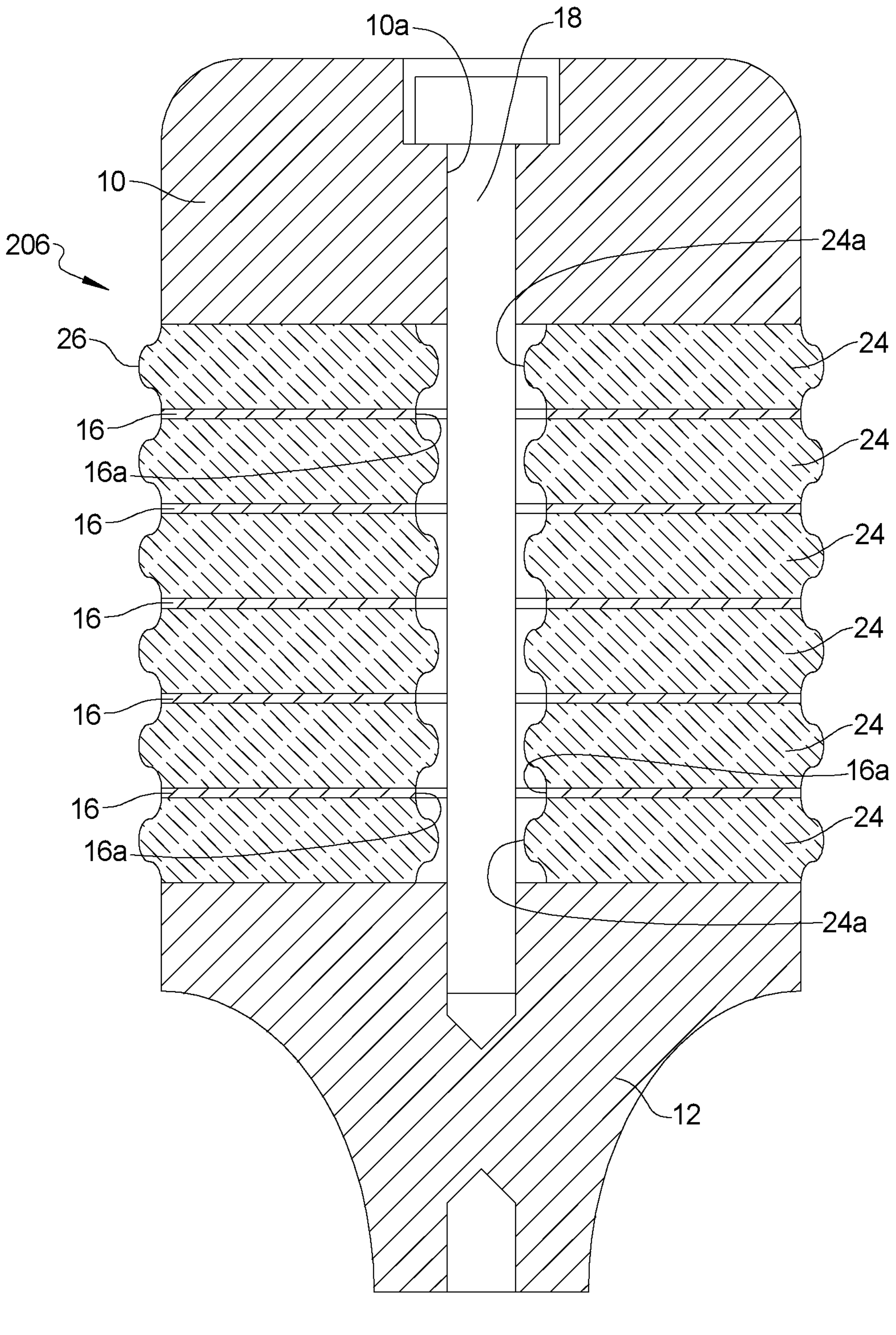
FIG. 2 is a cross-sectional view of a converter according to the principles of the present disclosure.

With reference to FIG. 2, a cross-sectional view of an example converter 206 according to the principles of the present disclosure is shown. Similar to conventional converter 106, the converter 206 according to the present example disclosure includes a back driver 10 and a front driver 12 which can each be formed from metal. A plurality of piezoelectric disks 24 are stacked alternately with metal conductor disks 16 in between. The piezoelectric disks 24 can be formed from a piezoelectric ceramic material or other piezoelectric material. The converter 206 can be held together by a bolt 18 inserted through a hole **10*a* in the back driver 10, a hole 24*a* in each of the piezoelectric disks 24, a hole 16*a* in each of the metal conductor disks 16 and threadedly engaged with a threaded aperture 12*a* in the front driver 12**.

The piezoelectric disks 24 include an outer perimeter surface 26 that can be provided with an undulating surface or other surface that increases the arc length along the outer perimeter surface 26. The "arc length" is the linear distance along the outer perimeter surface from one edge of the outer perimeter surface to the other edge. In the prior art of FIG. 4, because the outer perimeter surface of the piezoelectric disks 14 is a cylindrical surface, the arc length is equal to a thickness of the piezoelectric disks 14. In contrast, the piezoelectric disks 24 of the present example have an undulating outer perimeter surface 26 in order to increase the linear distance along the outer perimeter surface and therefore increases the arc length as compared to a thickness of the piezoelectric disks 24. One aspect of the present disclosure is to increase the path length of these end surfaces on the piezo material so that the resistance to arc over between the plates is increased, thus allowing for more powerful converter designs.

Figure 5A:
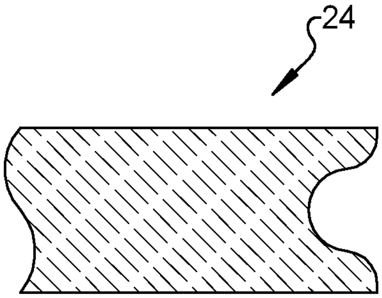
FIG. 5A-5D are example cross-sectional views of alternative cross-sections of edge surfaces of the piezoelectric disks.
Figure 5B:
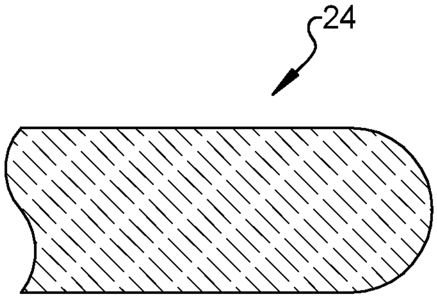

The embodiment of the undulating surfaces shown in FIG. 2 is one method of increasing path length on the end surfaces. Any geometry that can increase the path length (and thus the arc length) of the piezo edges over that of a straight line can be used as an alternate embodiment. Accordingly, as shown in FIG. 5A, the undulating surfaces can be reversed so that they undulate inward instead of outward. Yet another example embodiment as shown in FIG. 5B is to have the surfaces just rounded. This has the advantage of ease of manufacture.

Figure 5C:
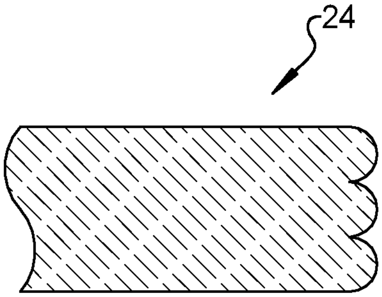
Figure 5D:
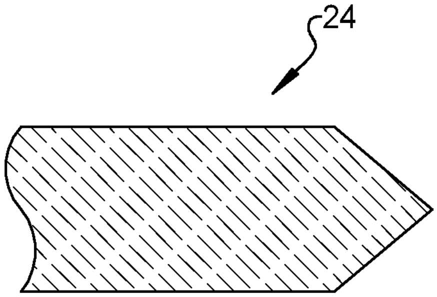

Alternatively, as shown in FIG. 5C, the outer perimeter surface can be scalloped. Yet another embodiment as shown in FIG. 5D is to have the surfaces pointed, which has the advantage of ease of manufacture. Alternatively, the surfaces can be pointed inward. All the above embodiments can be repeated over the surfaces or can be combined in any combination over the surfaces. A preferred shape of the piezo material is substantially a disk-like ring. Alternatively, the outside shape of the piezoelectric disks 24 need not be circular—it can be any shape.

One of the methods in the prior art to help mitigate the arc over is to use insulating coatings on the outside of the piezo stack. Typically, a high-power piezo stack has a hole down its center to accommodate a bolt that holds the stack together under compression. In the prior art, this hole is not coated because of the difficulty of applying the coating after assembly of the stack. If the coating is applied before assembly and dries, when the bolt is applied, the coating cracks when the disks are compressed. If the coating is applied wet before assembly, when the bolt is applied, which is typically done manually, the coating gets on the bolt which prevents assembly.

Figures 3A, 3B, 3C, 3D:
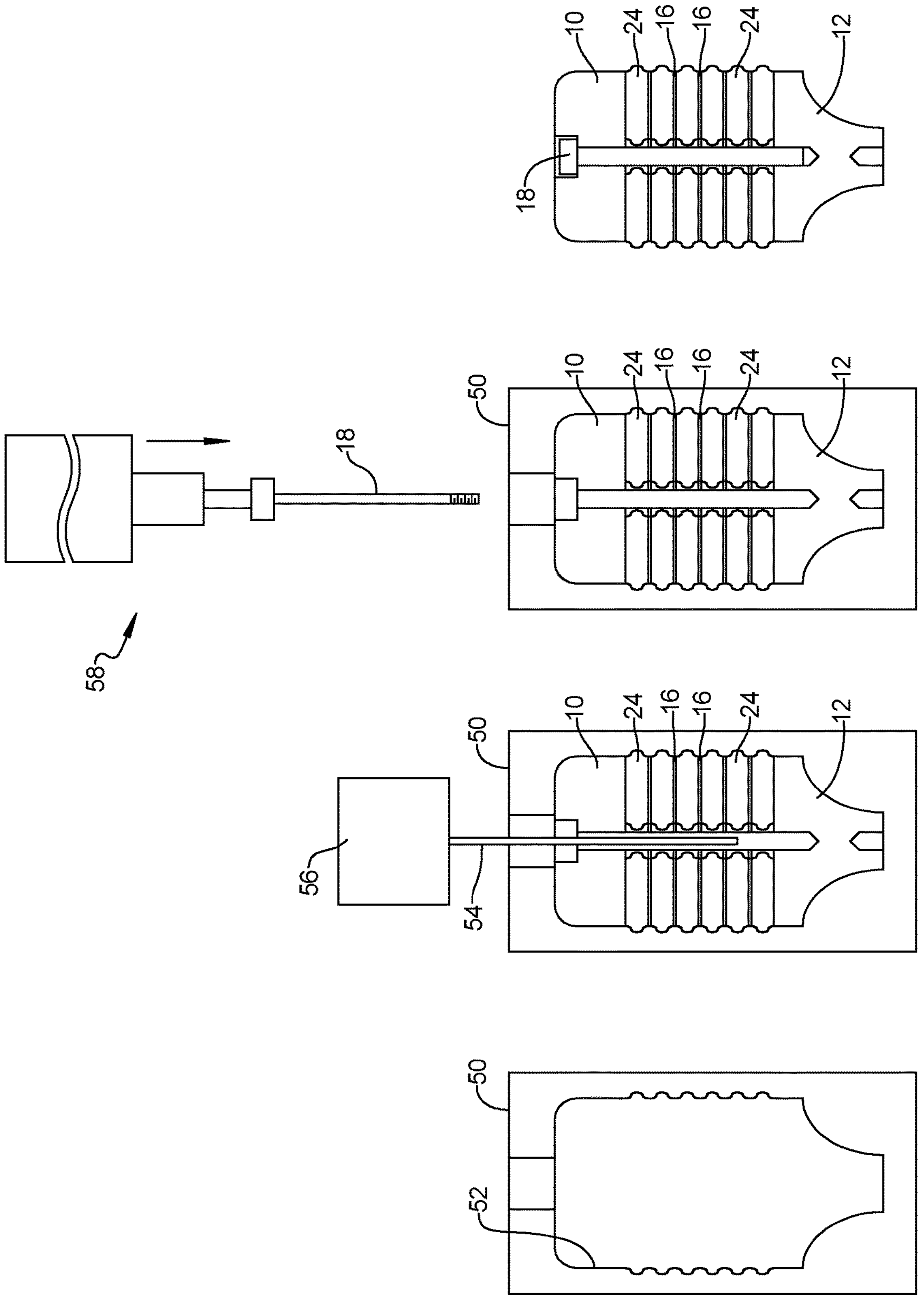
FIGS. 3A-3D are schematic views illustrating an assembly process of a converter according to the principles of the present disclosure.

Another aspect of the invention is to apply an insulating coating wet on an inside of any holes of the piezoelectric stack before the stack is assembled. With reference to FIGS. 3(*a*)-3(*d*) an assembly process for the converter is shown. As shown in FIG. 3(*a*), a fixture or jig 50 is shown including a cavity 52. As shown in FIG. 3(*b*), the components 10, 12, 24, 16 of the converter assembly are inserted into the cavity 52 of the jig 50 in stacked relationship. As further shown in FIG. 3(*b*) a spray nozzle 54 can then be inserted into the holes 10*a*, 24*a*, and 16*a* of the components 10, 24 and 16 and a spray of insulating coating can be applied inside of the holes 10*a*, 24*a*, 16*a* by a spray device 56. As shown in FIG. 3(*c*) the bolt 18 can be mechanically placed precisely within the holes by an automated system 58 to avoid contact with the wet coating and can be threadedly engaged with the threaded aperture 12*a* in the front driver 12 while the coating is wet. The converter assembly 24 can then be removed from the jig 50 and the exterior surface can also be coated with the insulating coating. The whole assembly 24 is then allowed to dry. The insulating coating increases resistance to arc over both on the exterior and interior thereof, thus also allowing more a powerful converter design.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A converter for an ultrasonic welder, comprising:
a stack of piezoelectric disks alternately stacked with metal conductor disks in between;
a pair of driver plates disposed on opposite ends of the stack of piezoelectric disks;
wherein the stack of piezoelectric disks include an undulating outer perimeter surface in a stacking direction of the piezoelectric disks.

2. The converter according to claim 1, wherein the undulating outer perimeter surface of the piezoelectric disks are rounded.

3. The converter according to claim 1, wherein the undulating outer perimeter surface of the piezoelectric disks undulate radially outward.

4. The converter according to claim 1, wherein the undulating outer perimeter surface of the piezoelectric disks undulate radially inward.

5. The converter according to claim 1, wherein the undulating outer perimeter surface is coated with an insulating coating.

6. The converter according to claim 1, wherein each of the stack of piezoelectric disks include an aperture therethrough with an undulating inner perimeter surface in the stacking direction.

7. The converter according to claim 6, wherein the undulating inner perimeter surface is coated with an insulating coating.

8. A converter for an ultrasonic welder, comprising:
at least one piezoelectric disk;
a pair of driver plates disposed on opposite ends of the at least one piezoelectric disk;
wherein the at least one piezoelectric disk includes an outer perimeter surface with an arc length that is greater than a thickness of the at least one piezoelectric disk.

9. The converter according to claim 8, wherein at least one piezoelectric disk includes an aperture therethrough with an inner perimeter surface with an arc length that is greater than thickness of the at least one piezoelectric disk.

10. The converter according to claim 9, wherein the inner perimeter surface is coated with an insulating coating.

11. The converter according to claim 9, wherein the inner perimeter surface of the aperture in the at least one piezoelectric disk has an undulating surface in the stacking direction.

12. The converter according to claim 8, wherein the outer perimeter surface of the at least one piezoelectric disk has an undulating surface in a stacking direction of the at least one piezoelectric disk and the pair of driver plates.

13. The converter according to claim 8, wherein the outer perimeter surface is coated with an insulating coating.

14. A method of assembling a converter for an ultrasonic welder comprises:
placing at least one piezoelectric disk between a first driver plate and a second driver plate and all within a jig, the at least one piezoelectric disk having at least one hole;
applying a liquid insulating coating inside the at least one hole of the at least one piezoelectric disk while the at least one piezoelectric disk and the first driver plate and the second driver plate are held secure by the jig; and inserting a bolt through a hole in the first driver plate, the hole in the at least one piezoelectric disk and tightening the bolt into a threaded hole in the second driver plate to create an assembled converter, wherein the at least one piezoelectric disk has an outer perimeter surface with an arc length between the metal conductor disks that is greater than a thickness of the at least one piezoelectric disk.

15. The method according to claim 14, further comprising applying a liquid insulating coating to an exterior surface of the assembled converter.

16. The method according to claim 14, wherein the outer perimeter surface of the at least one piezoelectric disk has an undulating surface in a stacking direction of the at least one piezoelectric disk, the first driver plate and the second driver plate.

17. The method according to claim 14, wherein the hole in the at least one piezoelectric disk has an inner perimeter surface with an arc length that is greater than a thickness of the at least one piezoelectric disk.

18. The method according to claim 17, wherein the inner perimeter surface of the hole in the at least one piezoelectric disk has an undulating surface in a stacking direction of the at least one piezoelectric disk, the first driver plate and the second driver plate.

* * * * *